United States Patent [19]

Kurosawa

[11] Patent Number: 5,307,703
[45] Date of Patent: May 3, 1994

[54] HEAD ADJUSTING DEVICE

[75] Inventor: Yuichi Kurosawa, Tokyo, Japan

[73] Assignee: Asahi Kogaku Kogyo Kabushiki Kaisha, Tokyo, Japan

[21] Appl. No.: 645,473

[22] Filed: Jan. 24, 1991

[30] Foreign Application Priority Data

Jan. 25, 1990 [JP] Japan .................... 2-13732

[51] Int. Cl.⁵ .................... F16H 27/02; F16H 53/06
[52] U.S. Cl. .................... 74/89; 74/399; 74/567; 74/569
[58] Field of Search ............. 74/55, 89, 107, 568 R, 74/568 M, 568 T, 564, 421 R, 347, 399, 207

[56] References Cited

U.S. PATENT DOCUMENTS

| | | | |
|---|---|---|---|
| 2,377,234 | 5/1945 | Kasen | 74/568 R X |
| 2,484,348 | 10/1949 | Kellogg et al. | 74/569 X |
| 2,775,903 | 1/1957 | Reed | 74/397 |
| 2,832,410 | 4/1958 | Soss | 74/55 X |
| 3,238,328 | 3/1966 | Harris | 74/107 X |
| 4,700,095 | 10/1987 | Kawakami | 310/91 |
| 4,835,646 | 5/1989 | Kurosawa et al. | 360/109 |
| 4,858,047 | 8/1989 | Cannon et al. | 360/106 |
| 4,862,445 | 8/1989 | Sasaki | 369/75.2 |
| 4,873,932 | 10/1989 | Adams | 74/569 X |
| 4,901,821 | 2/1990 | Robbins | 74/569 X |
| 4,989,109 | 1/1991 | Morisawa | 360/109 |

FOREIGN PATENT DOCUMENTS

| | | |
|---|---|---|
| 0224852 | 6/1987 | European Pat. Off. . |
| 3637247 | 5/1987 | Fed. Rep. of Germany . |
| 62-149078 | 7/1987 | Japan . |
| 62-245577 | 10/1987 | Japan . |
| 63-106964 | 5/1988 | Japan . |
| 1-66877 | 3/1989 | Japan . |
| 1-232579 | 9/1989 | Japan . |
| 2141571 | 12/1984 | United Kingdom . |

OTHER PUBLICATIONS

Patent Abstracts of Japan (vol. 13, No. 557 (P-974), Dec. 12, 1989).
Patent Abstracts of Japan (vol. 11, No. 383 (P-646), Dec. 15, 1987).
Patent Abstracts of Japan, (vol. 12, No. 119, (P-689), Apr. 14, 1988).
English Language Translation of German Office Action of Oct. 7, 1992.
United Kingdom Search Report [App. No. 9101587.5 24 May 1991].

Primary Examiner—Leslie A. Braun
Assistant Examiner—David W. Laub
Attorney, Agent, or Firm—Sandler Greenblum & Bernstein

[57] ABSTRACT

A device is provided for adjusting the position of an element, arranged to be movable in a predetermined direction, comprising a driving member for generating driving force to be applied to the element, and a transferring member for transferring the driving force to the element. The device further comprising a plate member, arranged to be movable in parallel to the predetermined direction, for supporting at least the driving member. Thus, it becomes possible to easily execute a position adjustment operation of the predetermined element along the predetermined direction. Such position adjustment can be easily effected by only moving the plate member.

8 Claims, 4 Drawing Sheets

HEAD ADJUSTING DEVICE

BACKGROUND OF THE INVENTION

The present invention relates to a head adjusting device provided with, for example, a magnetic recording apparatus for recording and reproducing data to and from a magnetic disk. More particularly, the present invention is drawn to a head adjusting device arranged in such a manner that a positional relationship adjustment thereof to a desired position, for example, an initial tracking position or a final tracking position and so forth, can be easily executed.

In a magnetic data recording apparatus for recording and reproducing data to and from a magnetic disk such as a floppy disk and the like, the recording and reproducing operations are carried out by causing a magnetic head to come into contact with the recording surface of the magnetic disk arranged to be rotated.

The recording surface of this type of magnetic disk has a multiplicity of concentric magnetic recording tracks. The magnetic head comes into contact with any one of these tracks for effecting the recording and reproducing. It is then moved in the radial direction thereof for effecting recording and reproducing for the desired recording track.

FIG. 1 shows an example of a conventional head adjusting device for moving a carriage on which the above magnetic head is mounted, in a tracking direction, indicated by an arrow T', of the magnetic disc. In FIG. 1, 1' designates the magnetic head and 2' designates a carriage for supporting the magnetic head 1' thereon. The carriage 2' is slidably supported by two parallel guide bars 3', 4', respectively fixed to a chassis, not shown, of the magnetic data recording apparatus. The carriage is urged in a direction substantially parallel to the tracking direction of the disc and toward the center of the disc by a bias force applied by means of a spring 6'. A spindle motor 5', including a spindle 5a', is provided for rotating the magnetic disc. A step motor 11', fixed to a base, not shown, is provided on the chassis or the like, by means of a pair of screws 15', 15', passing through slots 11b', 11b', defined in both side flanges of the step motor 11'.

The above step motor 11' is provided with a pinion 9', which is brought into engagement with a driven gear 10' to enable a spiral cam 7', coaxially provided with the driven gear 10', to be rotated. The cam 7' comes into contact with a cam follower 8' provided on the carriage 2', and the carriage 2', as well as the magnetic head 1', supported by the carriage 2', are moved in the tracking direction by rotation of the cam 7'.

Positional adjustment of the magnetic head 1' is conventionally carried out such that a rotational shaft of the step motor 11', not shown, is locked so as not to be rotated by energization of the step motor 11'. The step motor 11' is then excited while the screws 15' are loosened. Thus, the main body of the step motor 11' is rotated along the slots 11b' about the rotational shaft of the step motor 11', and the spiral cam 7' is directly rotated, without a rotation of the rotational shaft of the step motor 11', through the driven gear 10', to cause the carriage to move in the tracking direction T'.

In the conventional device, however, a problem arises in that the adjustable range is limited by the speed reduction ratio between the pinion 9' and the driven gear 10', which is defined by the number of teeth of the pinion 9' and the driven gear 10'. In other words, since the cam 7' is only slightly rotated in accordance with the speed reduction ratio, the adjustable range is extremely limited. Further, another problem also arises in that a sufficient dead space is needed to enable a terminal plate 11a, through which electrical power for driving the step motor 11' is supplied, projecting from the step motor 11' to be rotated during the above position adjusting operation.

SUMMARY OF THE INVENTION

It is therefore an object of the invention to provide an improved head adjusting device in which a positional adjustment of a head can be easily executed when the device is assembled, an adjustable range is increased, a step motor can be easily assembled, and a dead space for the terminal plate of the step motor is reduced.

For this purpose, according to the present invention, there is provided a device for adjusting the position of an element, movable in a predetermined direction, comprising a driving member for generating driving force to be applied to the element, and a transferring member for transferring the driving force to the element. The device further comprising a plate member arranged to be movable in parallel to the predetermined direction for supporting at least the driving member.

DESCRIPTION OF THE ACCOMPANYING DRAWINGS

DESCRIPTION OF THE EMBODIMENTS

An embodiment according to the present invention will be described below with referring to FIGS. 2 and 3.

Figure 1:
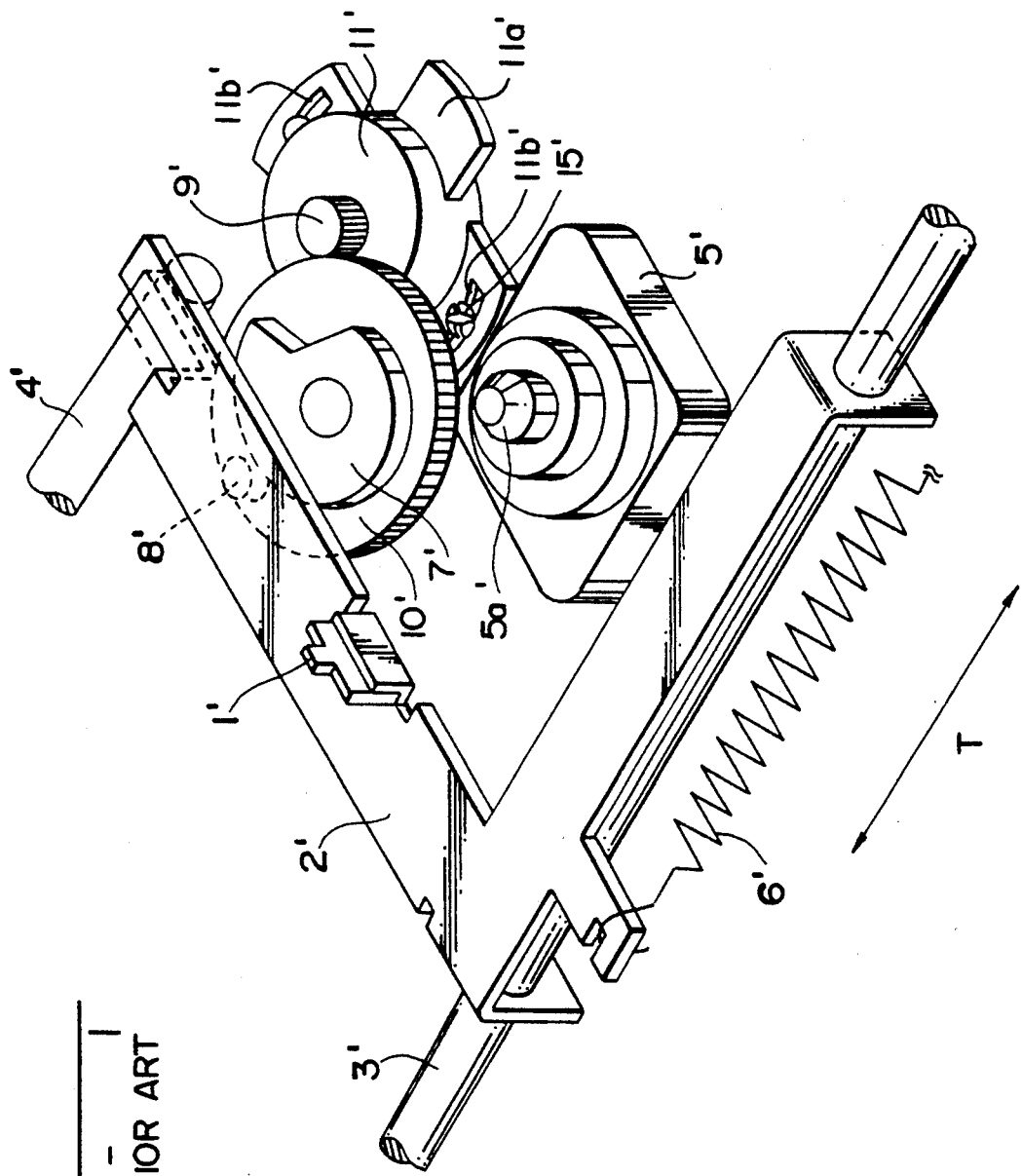
FIG. 1 is a perspective view showing a conventional head adjusting device.
Figure 2:
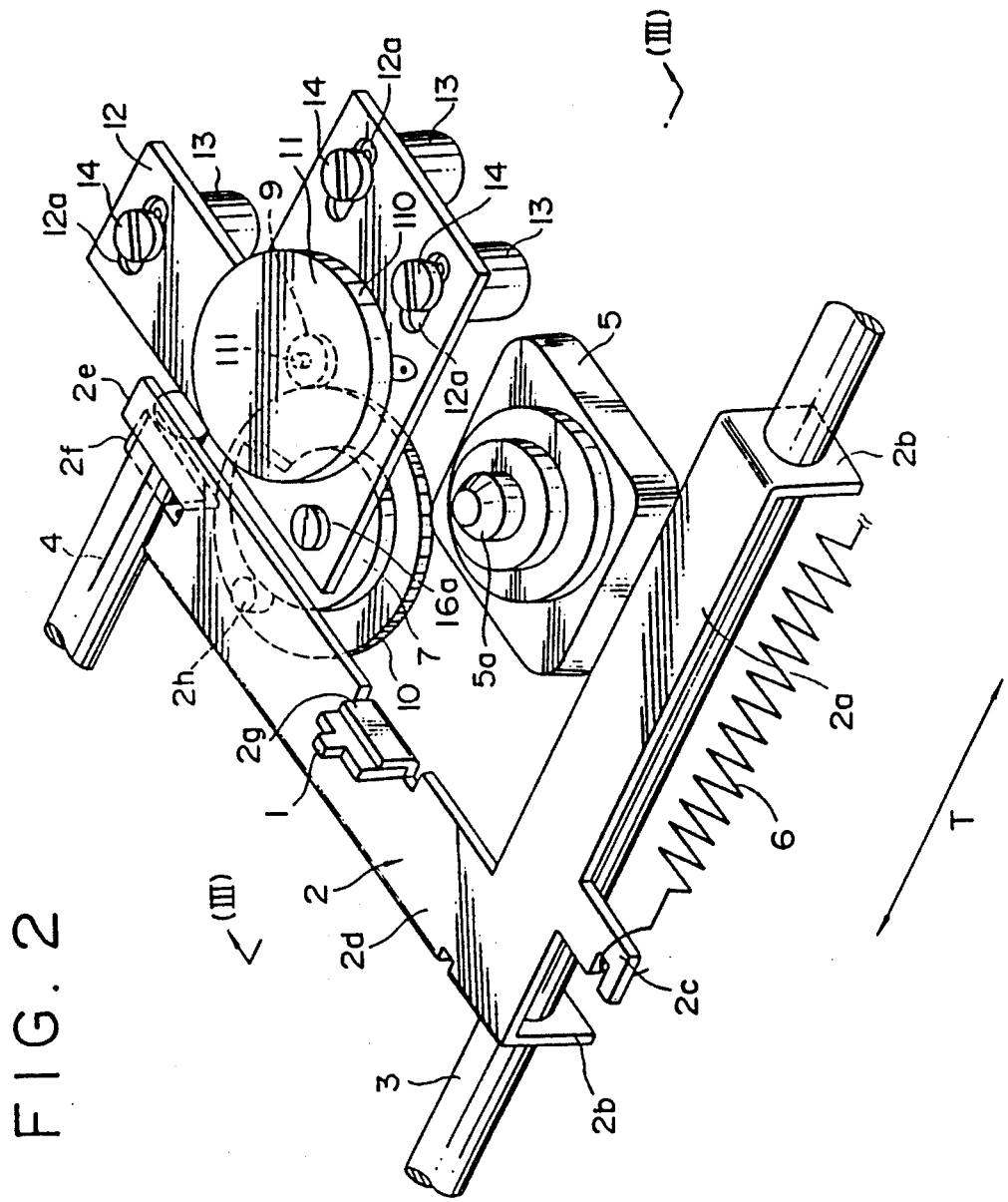
FIG. 2 is a perspective view showing a head adjusting device as an embodiment according to the present invention.
Figure 3:
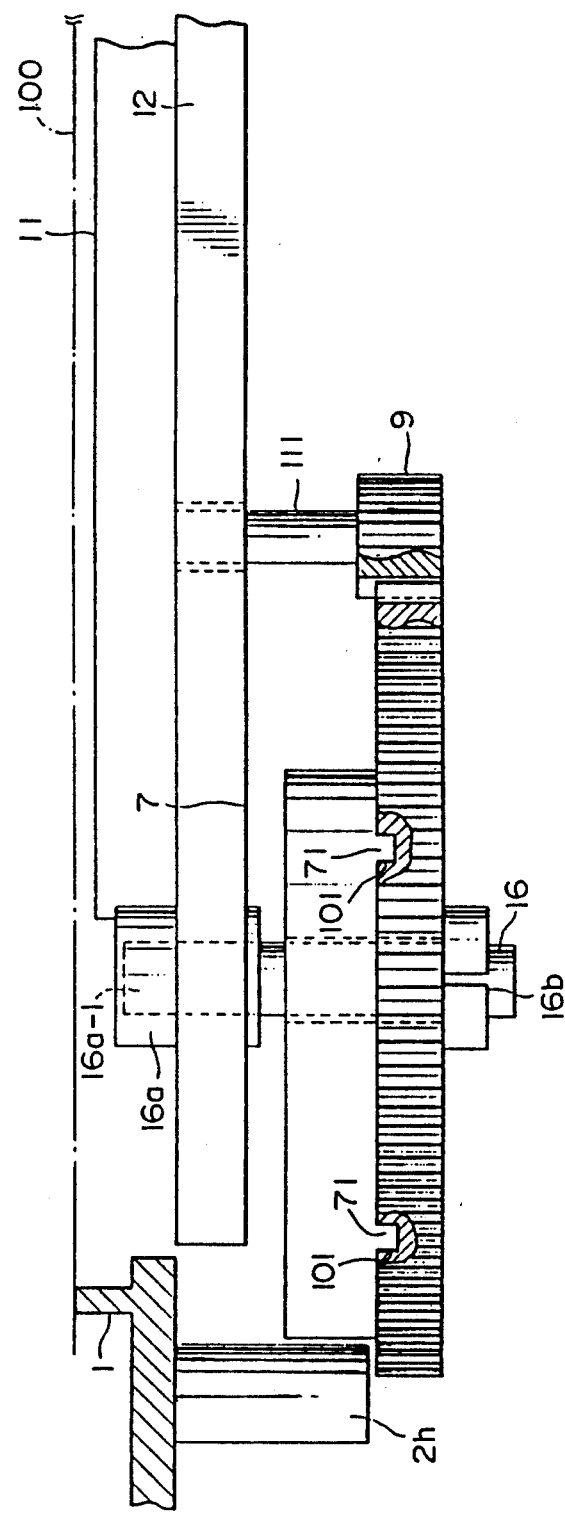
FIG. 3 is a sectional view of the head adjusting device shown in FIG. 2, sectioned along the line (III)—(III)

In FIGS. 2 and 3, 5 designates a spindle motor, including a spindle 5a, for rotating a magnetic disk 100 (FIG. 3), 1 designates a magnetic head for recording and reproducing data to and from the magnetic disk 100, and 2 designates a carriage for supporting the above magnetic head 1.

The above carriage 2 comprises an "L"-shaped frame and is slidingly attached to two parallel guide bars 3, 4 respectively fixed to a chassis, not shown, of a magnetic data recording apparatus in which the head adjusting device is to be provided. More specifically, tongue pieces 2b, 2b are formed at the opposite ends of the lateral frame portion 2a of the carriage 2, extending along tracking direction "T" of the disk 100, and the guide bar 3 on the one hand slidingly passes through these tongue pieces 2b, 2b. In addition, a spring hook 2c projects from the lateral frame portion 2a and a spring 6 is fitted between the spring hook 2c and a not shown fixing piece fixed to the chassis.

At an end of a longitudinal frame portion 2d orthogonal to the lateral frame portion 2a, a portion arranged to be downwardly bent is provided to form a pair of upper and lower pressing pieces 2e, 2f, between which the guide bar 4 is arranged to slidingly come into contact with the pieces 2e, 2f. In addition, a support piece 2g is formed substantially at the center of the longitudinal frame portion 2d and the above magnetic head 1 is fixed to the support piece 2g. Further, a cam follower 2h downwardly projects from the rear side of the longitudinal frame portion 2d and abuts against a spiral cam 7 to be described later.

Further, 11 designates a step motor, 10 designates a driven gear, and 7 designates a spiral cam arranged to be integrally rotatable with the driven gear 10, with these components being supported by a support plate 12. The step motor 11 is fixed to the support plate 12 by means of a frame 110 surrounding the step motor 11 and being arranged to be fixed to the support plate 12.

As shown in FIG. 3, the spiral cam 7 and the driven gear 10 are connected so as to be integrally rotated by means of a pair of projection parts 71, 71 and a pair of recess portions 101, 101 adapted to be engaged with the projection parts 71, 71. A rotation shaft 111 of the step motor 11 is downwardly projected through a hole formed on the plate 12, and is further, coaxially provided with a pinion 9. In addition, the spiral cam 7 and the driven gear 10 are integrally attached to the rear side of the support plate 12 by a rotating shaft 16, the driven gear 10 is meshed with the above pinion 9 and the circumference of the spiral cam 7 abuts against the above cam follower 2h. The rotating shaft 16 is fixed to the plate 12 by means of a fixing member 16a integrally mounted on the plate 12. For example, a recess portion 16a-1 is formed inside of the fixing member 16a and the shaft 16 is inserted into the recess 16a-1 and fixed. The shaft 16 is, as shown in FIG. 3, redoubtably attached to the spiral 7 cam and the driven gear 10 and fixed to another fixing member 16b such as an E-type retaining ring.

The above support plate 12 is fixed to a plurality of columns 13 standing on the chassis. More specifically, a plurality of slots 12a are defined in the support plate 12 in correspondence to the columns 13 and the support plate 12 is fixed to the columns 13 by screws 14 passing through the slots 12a. On each of the columns 13, negative screw portions to be engaged with the screws 14 have been formed in advance. Therefore, the support plate 12 can be moved in a tracking direction of the magnet disk 100 by the length of the slots 12a.

In the above-structured head adjusting device, when the pinion 9 is rotated by the step motor 11, the driven gear 10 meshed therewith is rotated and thus the spiral cam 7 is also rotated. Since the cam follower 2h of the carriage 2 is pressed against the circumference of the spiral cam by the elastic force of the spring 6, the carriage 2 is moved along the guide bars 3, 4 in accordance with a rotational angle of the spiral cam 7, so that the magnetic head 1 supported thereby is also moved along the tracking direction. In the embodiment shown in FIGS. 2 and 3, when the spiral cam 7 is rotated clockwise, the magnetic head 1 is moved toward the center of the magnetic disk 100, i.e., rightward direction in the drawing, whereas, when the spiral cam 7 is rotated counterclockwise, the magnetic head 1 is moved toward the outside of the magnetic disk 100 along the tracking direction.

The fine positional adjustment of the above-described magnetic head adjusting device is effected as follows.

After the device has been installed, the rotation shaft 111 is locked so as not to be rotated by energisation of the step motor 11, i.e., the step motor 11 is excited and the screws 14 are loosened. When it is necessary to move the carriage 2 toward the center of the disk 100, the plate 12 is moved along the slots 12a against the biasing force applied from the spring 6. The support plate 12 as well as the carriage 2 supporting the magnetic head 1 are located at the desired position, for example, an initial tracking position or a final tracking position of the magnetic disk without changing a positional relationship between the spiral cam 7 and the cam follower 2h. In other words, the carriage 2 is pushed toward the center of the disk 100 through the cam follower 2h by the spiral cam 7. On the contrary, when it is necessary to move the carriage 2 toward the outside of the disk 100, the plate 12 is moved along the slot 12a toward the outside and located at the desired position in the tracking direction "T". In other words, a direction and an amount of moving of the plate 12 become a direction and an amount of moving of the carriage 2. Additionally, the moving force of the plate 12 is in a range in which the so-called "out of step" of the step motor 11 does not occur. Thereafter, the screws 14 are fastened and the support plate 12 is fixed to the columns 13. Further, in the embodiment, the plate 12 is fixed to the column 13 at three positions, which are not arranged in a row along the tracking direction, and accordingly, the plate 12 is not undesirably moved along a direction other than the tracking direction "T".

Figure 4:
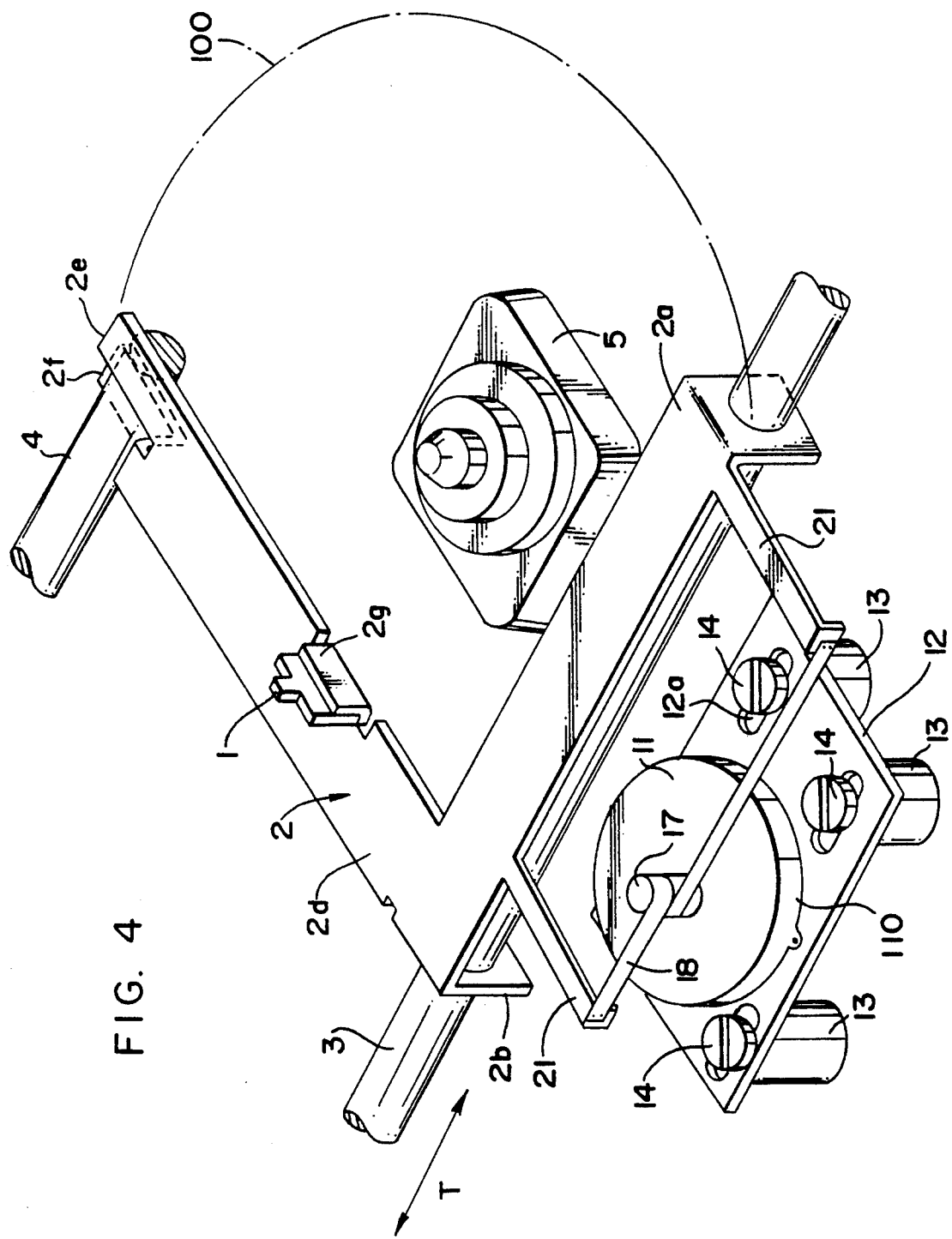
FIG. 4 is a perspective view showing a head adjusting device as another embodiment according to the present invention.

Fig. 4 shows another embodiment according to the present invention, in which a mechanism shown in the above embodiment, comprising the spiral cam 7, the cam follower 2h, the pinion 9, the driven gear 10 and the step motor 11, is replaced by a steel belt system, comprising a step motor 11, a pulley 17 arranged to be coaxially rotatable with the step motor 11 and a steel belt 18 arranged to be wound around the pulley 17 in an "α"-shaped configuration. The steel belt 18 is arranged not to slip around the pulley 17 and both edges thereof are moved as the step motor 11 is rotated. Further, the steel belt 18 has sufficient rigidity for moving the carriage 2 along the tracking direction "T". In this embodiment, a support plate 12 is fixed to columns 13 by screws 14 and a step motor 11 is attached to the support plate 12. Both ends of the steel belt 18 are respectively fixed to a pair of fixing portions 21, 21 arranged to be integrally formed and projected from the lateral frame portion 2a of the carriage 2. The end of the steel belt 18 is fixed to the fixing portions 21 by means of a predetermined method, for example, soldering. As a result, the steel belt 18 can be located between the pair of fixing portions 21, 21 in a tensioned state, through the pulley 17. With this arrangement, primarily, the step motor 11 is energized so that a rotating shaft thereof is not rotated, i.e., the step motor is excited, and screws 14 are loosened. Further, the plate 12 is moved along the tracking direction "T", and the carriage 2 as well as the steel belt 18 are moved along the tracking direction "T" without rotation of the pulley 17. In this embodiment, the magnetic head 1 is easily located at the desired position in the tracking direction "T" such as in the above embodiment.

The above embodiments are only examples of this invention and the elements in these embodiments are not limited to those illustrated in FIGS. 2 and 4. For example, a so-called lead screw system may be employed instead of the spiral cam 7 and driven gear 10 in the former embodiment, or the steel belt 18 in the latter embodiment. Further, it is needless to say that the design of the carriage 2 and the guiding mechanism thereof may be arbitrarily changed, as necessary.

According to the embodiments as described above, since the step motor 11 for moving the carriage 2 and a driving mechanism for driving the carriage 2 are assembled on the single support plate 12, the positional adjustment of the head to the desired position in the tracking direction, for example, an initial tracking position or a final tracking position, can be effected by only moving the support plate. As a result, the position adjustment operation can be easily effected, and since the position of the head is moved by an amount of movement of the support plate, the head can be adjusted in a broad range. Moreover, since the above motor and the driving mechanism are arranged in a block, they can be easily assembled.

What is claimed is:

1. A device for adjusting the position of an element which is arranged to be moveable in a predetermined direction, comprising:

driving means for generating a driving force;

a cam member, coupled to said driving means, and rotated by said driving force of said driving means;

a driven member which is fixed to said element and adapted to contact said cam member;

a support plate mounted for movement parallel to said predetermined direction, and to which at least said driving means and said cam member are attached; and biasing means for providing a biasing force so that said driven member and said cam member contact each other, whereby said element is moved in said predetermined direction upon rotation of said cam member in contact with said driven member by means of said biasing force of said biasing means and wherein movement of said support plate in said predetermined direction comprises means for adjusting a position of said element in said predetermined direction.

2. The device according to claim 1, wherein said support plate is provided with a plurality of oval holes whose longitudinal direction extends in parallel to said predetermined direction and arranged to be located at a desired position in said predetermined direction by means of screws inserted into said oval holes, whereby said support plate member is moved along said predetermined direction with said element.

3. The device according to claim 2, wherein said oval holes are not located along said predetermined direction in a row.

4. The device according to claim 1, wherein said driving member comprises a step motor, and said cam member is arranged to be rotated during a rotation of said step motor.

5. The device according to claim 4, wherein said driving force generated by said step motor is transmitted to said cam member by means of a pair o gear members in engagement with each other, one of said pair of gear members being arranged to be rotated with said step motor, while the other being arranged to be rotated with said cam member.

6. The device according to claim 1, wherein said element is arranged to be biased in parallel to said predetermined direction toward said driving member by said biasing means.

7. A device for adjusting the position of an element, arranged to be moveable in a predetermined direction and biased towards one side of said predetermined direction by means of a predetermined biasing member, comprising:

a step motor for generating driving force to be applied to said element, and a transferring mechanism including a cam member arranged to be rotated during a rotation of said step motor and to be brought into contact with a cam follower provided on said element for transferring said driving force to said element against the bias force of said predetermined bias member, said device further comprising a support plate, provided with a plurality of oval holes extending along said predetermined direction, said support plate arranged to be located at a desired position in said predetermined direction by means of screws inserted into said oval holes, said support plate comprising means for supporting said step motor and said transferring mechanism thereon, whereby said support plate is adjustably moved along said predetermined direction with said element in accordance with a position of said screws in said oval holes.

8. A device for adjusting the position of an element, arranged to be movable in a predetermined direction, comprising:

driving means for generating driving force to be applied to said element;

a transferring member for converting the driving force into a force acting along said predetermined direction and transferring the driving force to said element, said transferring member comprising a cam; and a support plate, arranged to be movable for adjustment in parallel to said predetermined direction, for supporting at least said driving member and said transferring member said transferring member and said element being arranged to be simultaneously moved in parallel to said predetermined direction during an adjustment movement of said support plate along said predetermined direction.

* * * * *

UNITED STATES PATENT AND TRADEMARK OFFICE
CERTIFICATE OF CORRECTION

PATENT NO. : 5,307,703  
DATED : May 3, 1994  
INVENTOR(S) : Yuichi KUROSAWA

It is certified that error appears in the above-indentified patent and that said Letters Patent is hereby corrected as shown below:

At column 6, line 3 (claim 5, line 3) change "o" to ---of---.

Signed and Sealed this

Nineteenth Day of September, 1995

Attest:

BRUCE LEHMAN

Attesting Officer

Commissioner of Patents and Trademarks